United States Patent
Brumley et al.

(10) Patent No.: US 10,293,193 B2
(45) Date of Patent: May 21, 2019

(54) AIRCRAFT LAVATORY EMERGENCY OXYGEN DEVICE

(75) Inventors: Michael J. Brumley, Shawnee, KS (US); Michael W. Veach, Platte City, MO (US)

(73) Assignee: B/E Aerospace, Inc., Winston-Salem, NC (US)

(*) Notice: Subject to any disclaimer, the term of this patent is extended or adjusted under 35 U.S.C. 154(b) by 574 days.

(21) Appl. No.: 13/528,414

(22) Filed: Jun. 20, 2012

(65) Prior Publication Data

US 2013/0340760 A1   Dec. 26, 2013

(51) Int. Cl.
*A62B 7/14* (2006.01)
*B64D 11/00* (2006.01)

(52) U.S. Cl.
CPC ............... *A62B 7/14* (2013.01); *B64D 11/00* (2013.01); *B64D 2231/02* (2013.01); *B64D 2231/025* (2013.01); *Y02T 50/46* (2013.01)

(58) Field of Classification Search
CPC .. A62B 7/14; B64D 2231/00; B64D 2231/02; B64D 2231/025
See application file for complete search history.

(56) References Cited

U.S. PATENT DOCUMENTS

| | | | | |
|---|---|---|---|---|
| 2,324,389 | A | * | 7/1943 | Heidbrink ................. 128/204.29 |
| 3,521,627 | A | * | 7/1970 | Murray ..................... 128/202.27 |
| 4,827,964 | A | * | 5/1989 | Guido et al. .................. 137/81.1 |
| 5,531,807 | A | * | 7/1996 | McCombs ......................... 95/26 |
| 5,803,062 | A | | 9/1998 | Aulger et al. |
| 7,481,216 | B1 | * | 1/2009 | Degenhardt et al. ..... 128/204.23 |
| 7,588,032 | B2 | | 9/2009 | Cannon |
| 7,784,463 | B2 | | 8/2010 | Cannon |
| 8,016,232 | B2 | | 9/2011 | Anderson et al. |
| 2005/0263156 | A1 | | 12/2005 | Westphal et al. |
| 2007/0283959 | A1 | * | 12/2007 | Rassloff .................... 128/204.18 |
| 2008/0072907 | A1 | * | 3/2008 | Deane et al. ............. 128/204.26 |
| 2009/0013996 | A1 | * | 1/2009 | Rittner et al. ............ 128/202.22 |
| 2009/0188504 | A1 | | 7/2009 | Siska, Jr. |
| 2010/0258127 | A1 | * | 10/2010 | HK ......................... A62B 9/022 128/205.11 |
| 2010/0319698 | A1 | * | 12/2010 | Cannon .................... 128/204.21 |

(Continued)

FOREIGN PATENT DOCUMENTS

EP   2151263 A1   2/2010

OTHER PUBLICATIONS

Pulse® Oxygen Technology (1 pg).

(Continued)

*Primary Examiner* — LaToya M Louis
(74) *Attorney, Agent, or Firm* — Donna P. Suchy

(57) ABSTRACT

An aircraft emergency oxygen dispensing device includes an oxygen storage vessel having a frangible pressure seal, and a manifold, a pressure regulator, one or more flow control valves connected to the oxygen storage vessel. The manifold includes an initiator for breaking the pressure seal to initiate a flow of oxygen. A flow controller controls the flow control valves to dispense small quantities of oxygen by a pulse oxygen system or a modulated oxygen system based on ambient cabin air pressure. In the pulse oxygen system, the flow controller further controls the flow control valves based on input from at least one breathing mask air pressure sensor that monitors the breathing of a user.

14 Claims, 15 Drawing Sheets

(56) References Cited

U.S. PATENT DOCUMENTS

| | | | |
|---|---|---|---|
| 2011/0041853 A1* | 2/2011 | Rittner et al. | 128/205.24 |
| 2012/0097166 A1* | 4/2012 | Libis et al. | 128/205.14 |
| 2012/0111871 A1 | 5/2012 | Sitabkhan et al. | |
| 2012/0160244 A1* | 6/2012 | Sharma HK | 128/204.23 |
| 2013/0275139 A1* | 10/2013 | Coleman | A61M 16/0672 |
| | | | 704/275 |

OTHER PUBLICATIONS

Federal Aviation Administration Memorandum dated Jan. 7, 2011.
EPO, International Search Report and Written Opinion from International Patent Application No. PCT/US2013/045995 dated Nov. 7, 2013.

* cited by examiner

AIRCRAFT LAVATORY EMERGENCY OXYGEN DEVICE

BACKGROUND OF THE INVENTION

The present invention generally relates to emergency oxygen supply systems such as are routinely carried on commercial aircraft for deployment upon loss of cabin pressure. More particularly, the invention pertains to enhancing the efficiency with which the supplied oxygen is used to thereby reduce the total amount of oxygen that needs to be carried on an aircraft.

Emergency oxygen supply systems are commonly installed on aircraft for the purpose of supplying oxygen to passengers upon loss of cabin pressure at altitudes above about 10,000 feet. Such systems typically include a face mask adapted to fit over the mouth and nose which is released from an overhead storage compartment when needed. Supplemental oxygen delivered by the mask increases the level of blood oxygen saturation in the mask user beyond what would be experienced if ambient air were breathed at the prevailing cabin pressure altitude condition. The flow of oxygen provided thereby is calculated to be sufficient to sustain all passengers until cabin pressure is reestablished or until a lower, safer altitude can be reached.

Each such face mask has a reservoir bag attached thereto into which a constant flow of oxygen is directed upon deployment of the system and upon activation of the individual face mask via a pull cord. The oxygen is supplied continuously at a rate that is calculated to accommodate a worst case scenario, namely to satisfy the need of a passenger with a significantly larger than average tidal volume who is breathing at a faster than average respiration rate when cabin pressure is lost at maximum cruising altitude. A total of three valves that are associated with the mask serve to coordinate flows between the bag and the mask, and between the mask and the surroundings. An inhalation valve serves to confine the oxygen flowing into the bag to the bag while the passenger is exhaling as well as during the post-expiratory pause and at all times also prevents any flow from the mask into the bag. When the passenger inhales, the inhalation valve opens to allow for the inhalation of the oxygen that has accumulated in the bag. Upon depletion of the accumulated oxygen, the dilution valve opens to allow cabin air to be drawn into the mask. The continuing flow of oxygen into the bag and through the open inhalation valve into the mask is thereby diluted by the cabin air that is inhaled during the balance of the inhalation phase. During exhalation, the exhalation valve opens to allow a free flow from the mask into the surroundings while the inhalation valve closes to prevent flow from the mask back into the bag. All three valves remain closed during the post-expiratory pause while oxygen continues to flow into the reservoir bag.

Inefficiencies in an emergency oxygen supply system can require the oxygen storage or oxygen generation means to be larger and therefore weigh more than necessary which of course has an adverse impact on the payload capacity and fuel consumption of the aircraft. Enhancing the efficiency of such a system either in terms of the generation, storage, distribution or consumption of oxygen could therefore yield a weight savings. Conversely, an enhancement of a system's efficiency without a commensurate downsizing would impart a larger margin of safety in the system's operation. It is therefore highly desirable to enhance the efficiency of an emergency oxygen supply system in any way possible.

An emergency oxygen supply system for use on aircraft in the event of a loss in cabin pressure is configured for delivering allotments of oxygen and timing the delivery such allotments to each passenger so as maximize the efficiency of the transfer of such oxygen into the passenger's bloodstream. The delivery of each allotment is selected so that the entire allotment is available for inhalation into the region of the lung most efficient at oxygen transfer while the volume of the allotment is selected to substantially coincide with the volume of such region of the lung.

The chemical reaction in chemical oxygen generators is exothermic, so that heat released by a chemical oxygen generator needs to be managed in the aircraft installation. Heat can damage nearby aircraft components, and management of the heat adds cost and weight to an aircraft installation.

In March 2011, airworthiness directive (AD) 2011-04-09 was issued by the FAA requiring the removal or disabling of chemical oxygen generators from aircraft lavatories. (see discussion in BEAFS-88039/86205) This AD is in conflict with FAR 25.1447 requiring supplemental emergency oxygen to be available in aircraft lavatories.

It would be desirable to provide an aircraft emergency oxygen dispensing device to dispense supplemental oxygen suitable for breathing generates substantially no heat in operation, and that resolves the conflict between the FAA airworthiness and the regulation requiring supplemental emergency oxygen to be available in aircraft lavatories, by providing a stored source of oxygen as an alternative to chemical oxygen generators for aircraft lavatories.

It would also be desirable to provide such an aircraft emergency oxygen dispensing device that reduces the quantity of oxygen that must be stored, thereby reducing the weight of the system. It would also be desirable to provide such an aircraft emergency oxygen dispensing device that is configured to fit within the dimensional envelope of an existing aircraft oxygen generator, allowing the device to be retrofit as a direct replacement in size, weight and function for an existing aircraft chemical oxygen generator, to reduce or eliminate the need to alter existing installations in aircraft. It would also be desirable to provide such an aircraft emergency oxygen dispensing device that operates substantially in the same manner as an aircraft chemical oxygen generator, and that can be used by an aircraft passenger or crew in the same manner as an aircraft chemical oxygen generator, thereby eliminating the need for additional or new training and explanation by flight crews. The present invention meets these and other needs.

SUMMARY OF THE INVENTION

Briefly and in general terms, the present invention provides for an aircraft emergency oxygen dispensing device for use in aircraft cabin to dispense supplemental oxygen suitable for breathing by a user in small quantities, that resolves the conflict between the FAA airworthiness and the regulation requiring supplemental emergency oxygen to be available in aircraft lavatories by providing a non-chemical source of oxygen for aircraft lavatories, generating substantially no heat in operation, reducing or eliminating the heat management concerns of a chemical oxygen generator, and requiring less oxygen, thus reducing the quantity of oxygen that must be stored, and reducing the weight of the system. The oxygen storage vessel and hardware are small enough to fit within the dimensional envelope of an oxygen generator, so that the device can be used as a direct replacement in size, weight and function for an aircraft chemical oxygen generator.

The present invention accordingly provides for an aircraft emergency oxygen dispensing device for use in aircraft cabin to dispense supplemental oxygen suitable for breathing by a user in small quantities. The device includes an oxygen storage vessel configured to store gaseous oxygen having suitable purity for breathing, a manifold, a pressure regulator, one or more flow control valves, and a flow controller. In a presently preferred aspect, the oxygen storage vessel is sealed by a pressure seal capable of being broken, and the pressure seal is configured to seal against flow from the oxygen storage vessel until the pressure seal is broken. In another presently preferred aspect, the pressure seal is a rupture disc formed of frangible material capable of being fractured to open the oxygen storage vessel and initiate the flow of oxygen from the oxygen storage vessel.

The manifold is preferably connected in fluid communication with the oxygen storage vessel and is configured to receive a flow of oxygen from the oxygen storage vessel having a first oxygen pressure. In another presently preferred aspect, the pressure seal is disposed in the manifold, and the manifold preferably includes an initiator configured to break the pressure seal to initiate a flow of oxygen from the oxygen storage vessel. In a presently preferred aspect, the initiator includes a lance configured to mechanically break the rupture disc. In another presently preferred aspect, the initiator is configured to be manually activated. In another presently preferred aspect, the initiator includes a lever configured to be manually turned to advance the lance to mechanically break the pressure seal. In another presently preferred aspect, the initiator is configured to be electronically activated.

The pressure regulator is connected in fluid communication with the manifold to receive a flow of oxygen from the oxygen storage vessel at the first oxygen pressure through the manifold, and the pressure regulator is configured to deliver the flow of oxygen at a second oxygen pressure lower than the first oxygen pressure. The one or more flow control valves are connected in fluid communication with the pressure regulator to receive and meter the flow of oxygen at the second oxygen pressure from the pressure regulator to one or more breathing masks, and the flow controller is connected to the one or more flow control valves. In a presently preferred aspect, the flow controller is also configured to be connected to receive an ambient cabin air pressure signal from an ambient cabin air pressure sensor indicating ambient cabin air pressure in the aircraft, and the flow controller is configured to determine a quantity of oxygen to be provided to the one or more breathing masks to control operation of the one or more flow control valves responsive to the ambient cabin air pressure signal. In another presently preferred aspect, the flow controller is configured to rapidly supply oxygen at an initial altitude and throughout at least a portion of subsequent descent of the aircraft.

In another presently preferred aspect, the aircraft emergency oxygen dispensing device includes a container housing covering at least a portion of the oxygen storage vessel, the manifold, the pressure regulator, the one or more flow control valves, and the flow controller. In another presently preferred aspect, the aircraft emergency oxygen dispensing device includes a power supply configured to provide power to the flow controller and the one or more flow control valves, and the container housing covers at least a portion of the power supply. In another presently preferred aspect, the aircraft emergency oxygen dispensing device includes an ambient cabin air pressure sensor connected to the flow controller and configured to detect the ambient cabin air pressure in the aircraft and generate a cabin air pressure signal indicating the ambient cabin air pressure in the aircraft, and wherein the container housing covers at least a portion of the ambient cabin air pressure sensor.

In another presently preferred aspect, the flow controller and the one or more flow control valves are configured to meter a small quantity of oxygen to the one or more breathing masks that is less than that provided by a chemical oxygen generator, while providing an equivalent level of hypoxia protection in aircraft decompression events. In another presently preferred aspect, the one or more flow control valves are configured to limit the flow of oxygen to the one or more breathing masks to a period of time during a respiratory cycle of the user that is sufficient to allow only a preselected volume of oxygen to flow to the one or more breathing masks during the respiratory cycle of the user.

In another presently preferred aspect, the aircraft emergency oxygen dispensing device includes a breathing mask air pressure sensor configured to generate a breathing mask air pressure signal indicating a pressure within the one or more breathing masks, the flow controller is connected to receive the breathing mask air pressure signal, and the flow controller is configured to control the one or more flow control valves to switch the flow of oxygen to the one or more breathing masks for a period of time during a respiratory cycle of the user that is sufficient to allow only a preselected volume of oxygen to flow to the one or more breathing masks during the respiratory cycle of the user responsive to the breathing mask air pressure signal.

In another presently preferred aspect, the flow controller is configured to control the one or more flow control valves to modulate the flow of oxygen to flow continuously to the one or more breathing masks. In another presently preferred aspect, the flow controller is configured to control the one or more flow control valves to modulate the flow of oxygen to flow continuously to the one or more breathing masks based upon the ambient cabin air pressure signal.

In another presently preferred aspect, the aircraft emergency oxygen dispensing device includes one or more breathing masks connected to receive the flow of oxygen at a second oxygen pressure from the one or more flow control valves, the one or more breathing masks are connected to at least one corresponding breathing mask air pressure sensor that monitors the breathing of the user, the at least one corresponding breathing mask air pressure sensor is connected to the flow controller, and the one or more flow control valves are controlled by the flow controller responsive to the at least one breathing mask air pressure sensor. In another presently preferred aspect, the at least one breathing mask air pressure sensor detects a differential vacuum pressure created by a user inhaling through the one or more breathing masks, the at least one breathing mask air pressure sensor is configured to generate a differential vacuum pressure signal, and the one or more flow control valves are controlled by the flow controller responsive to the differential vacuum pressure signal. In another presently preferred aspect, the at least one breathing mask air pressure sensor is disposed in the one or more breathing masks. In another presently preferred aspect, the breathing mask air pressure sensor may be an electro-pneumatic sensor.

These and other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
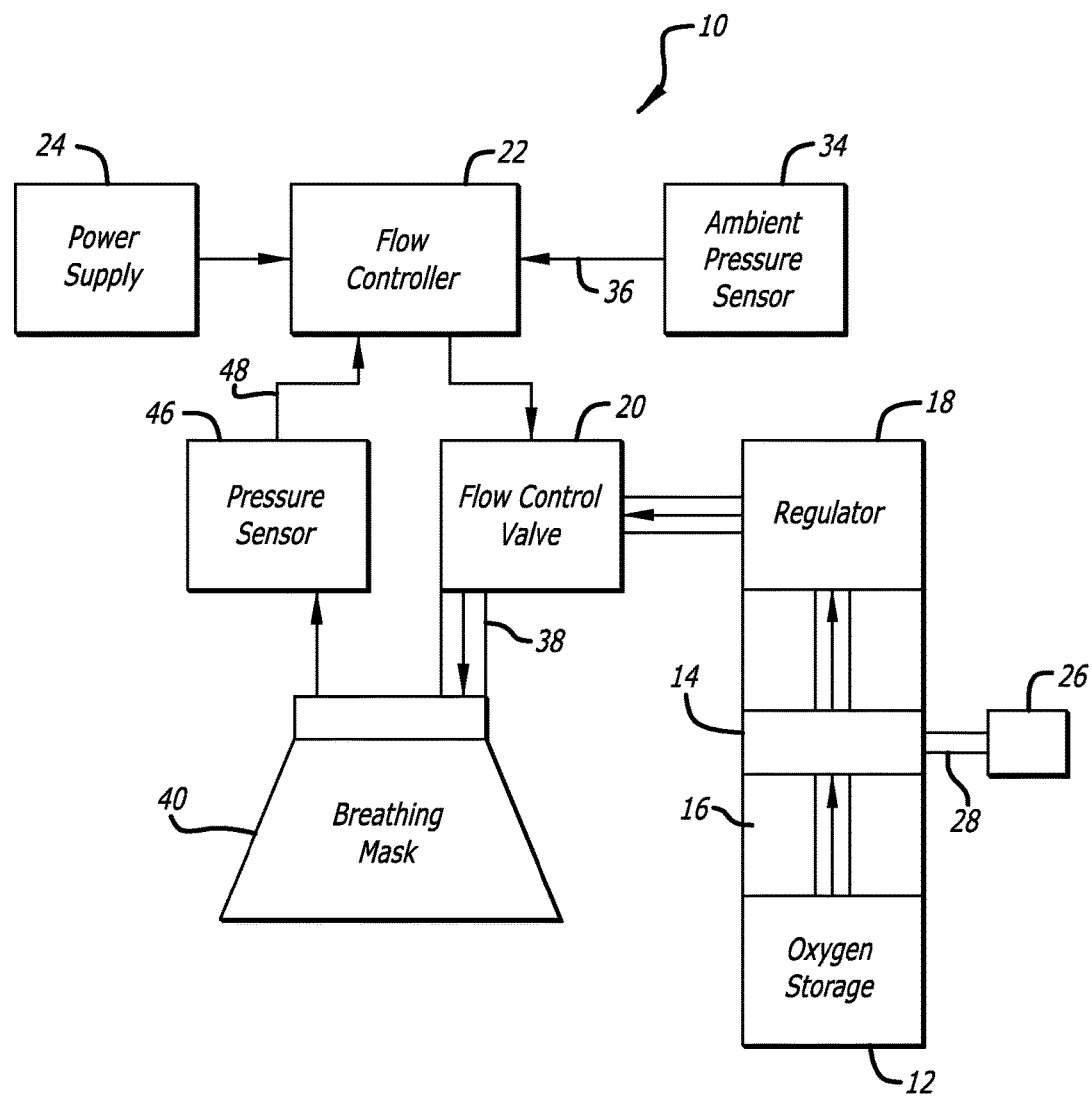
FIG. 1 is a schematic diagram of a first embodiment of an aircraft emergency oxygen dispensing device according to the present invention.
Figure 2:
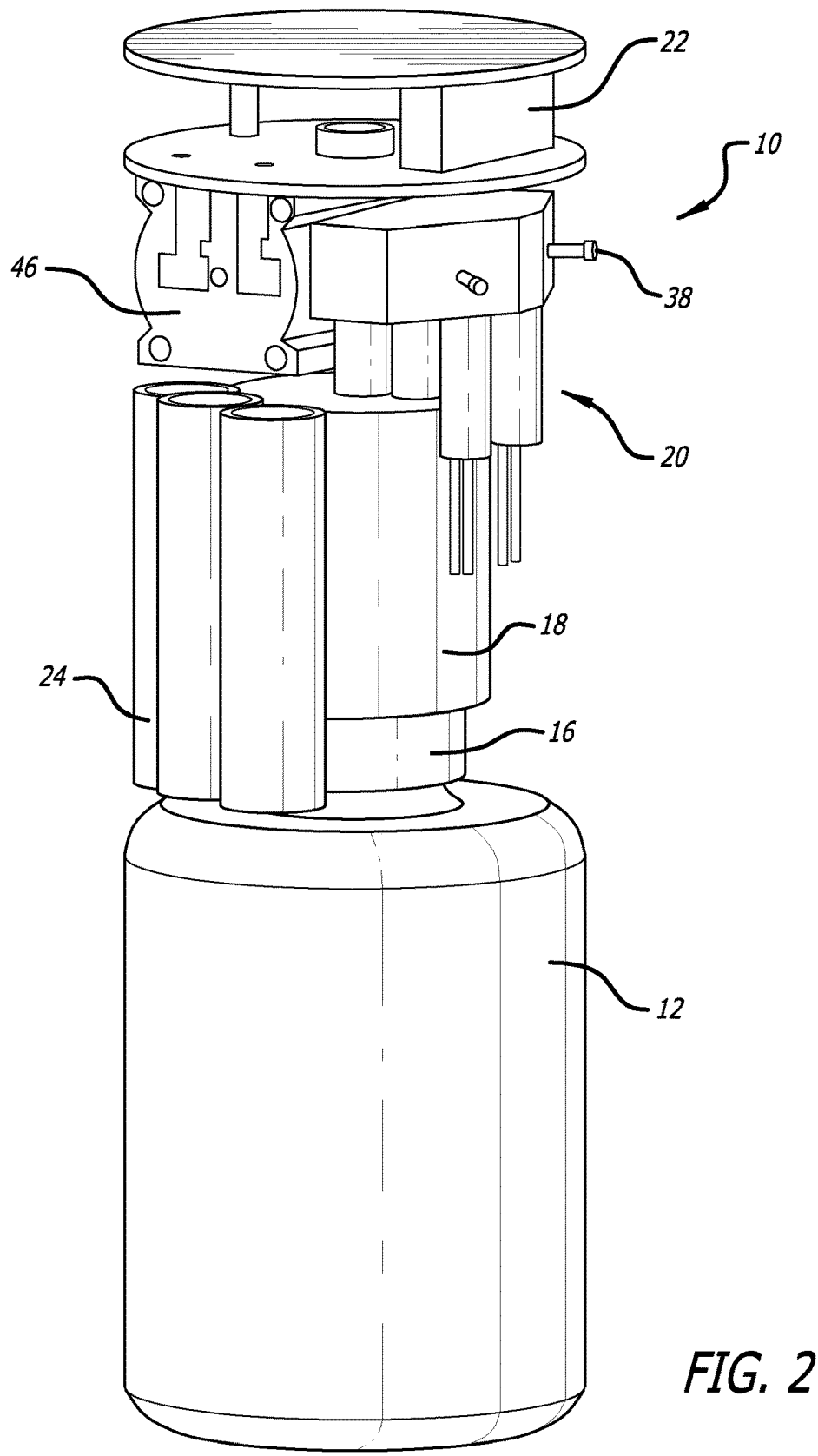
FIG. 2 is a first side view showing the internal components of the aircraft emergency oxygen dispensing device of FIG. 1.
Figure 3:
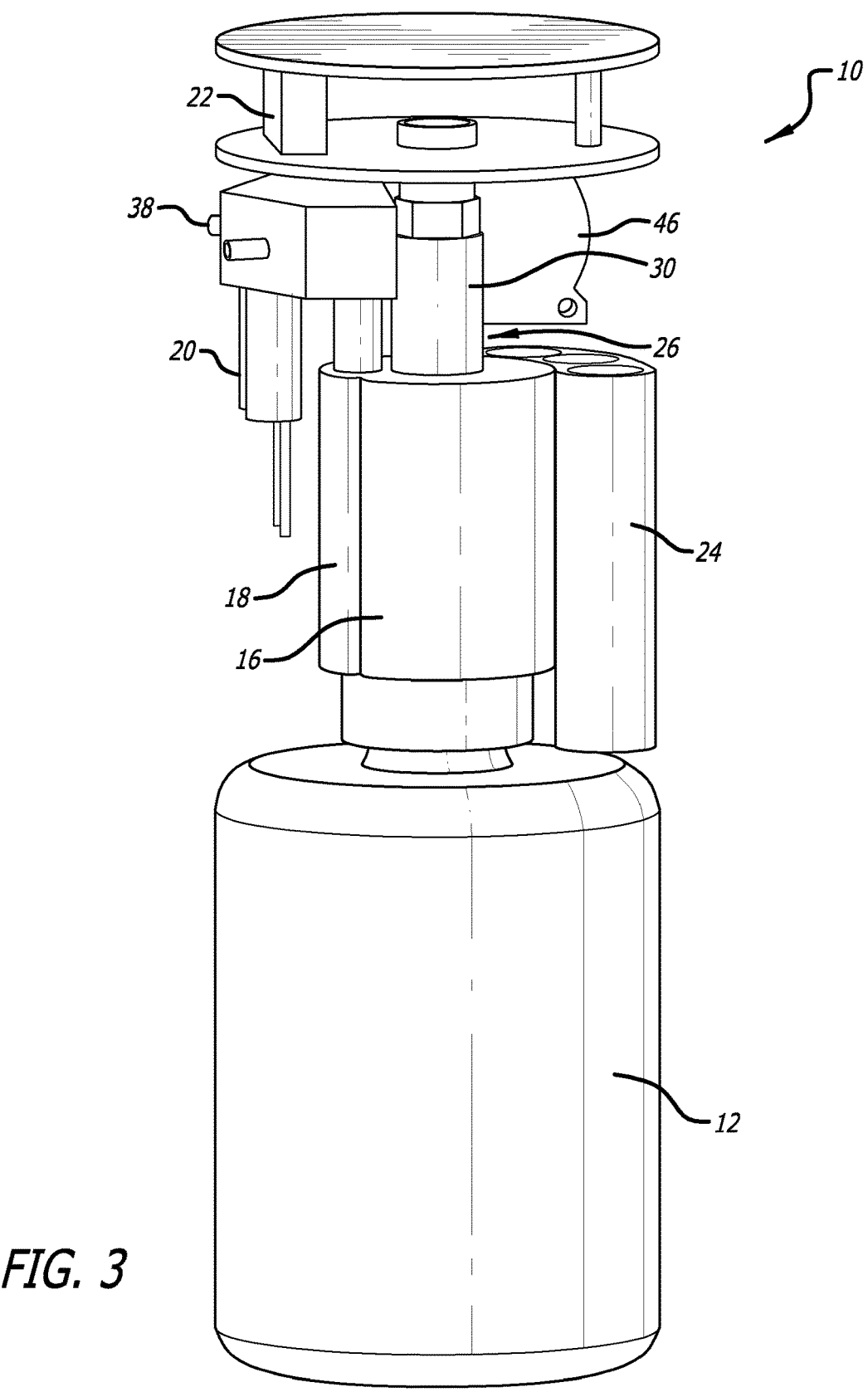
FIG. 3 is a second side view showing the internal components of the aircraft emergency oxygen dispensing device of FIG. 1.
Figure 4:
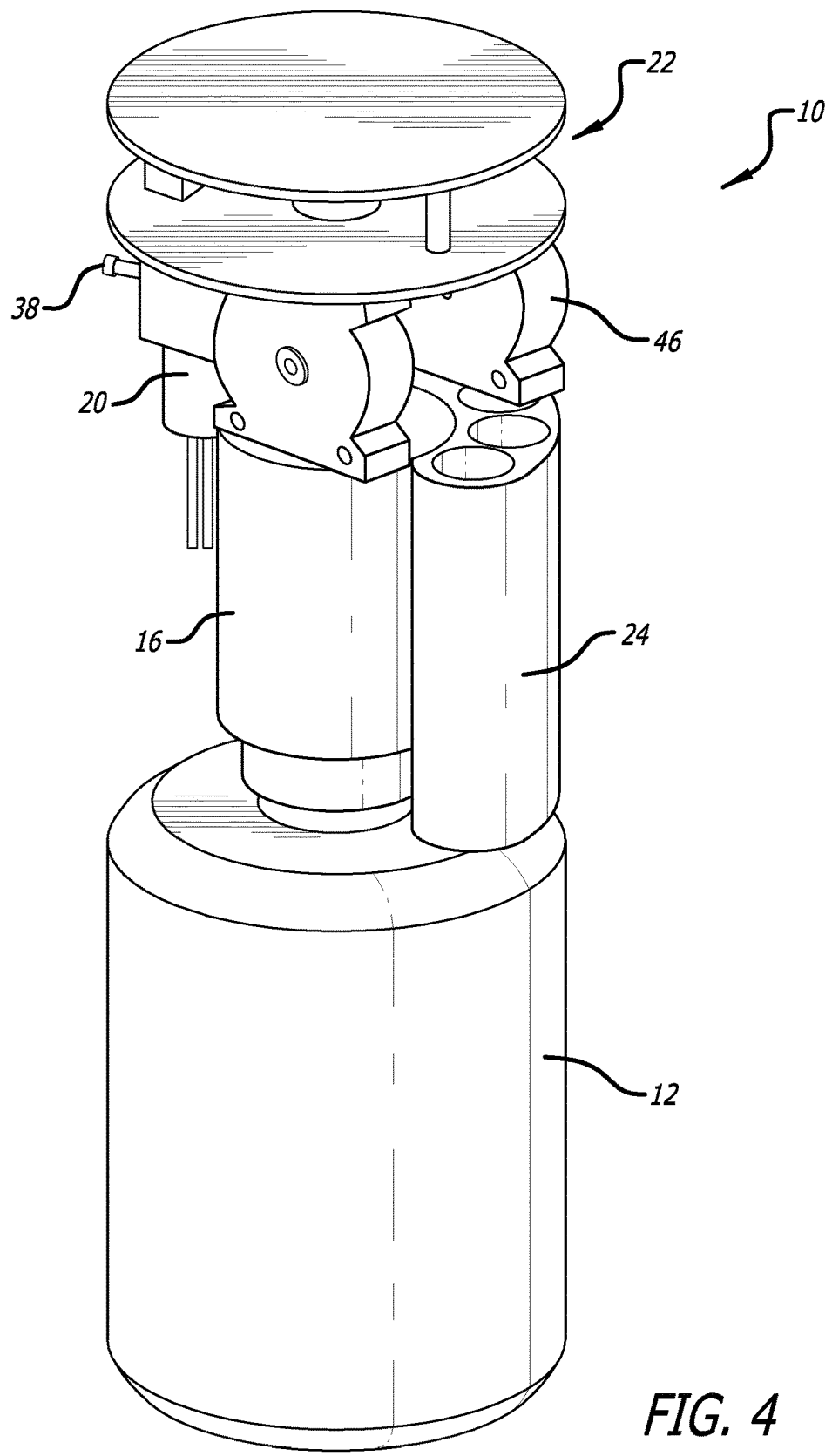
FIG. 4 is a first perspective view showing the internal components of the aircraft emergency oxygen dispensing device of FIG. 1.
Figure 5:
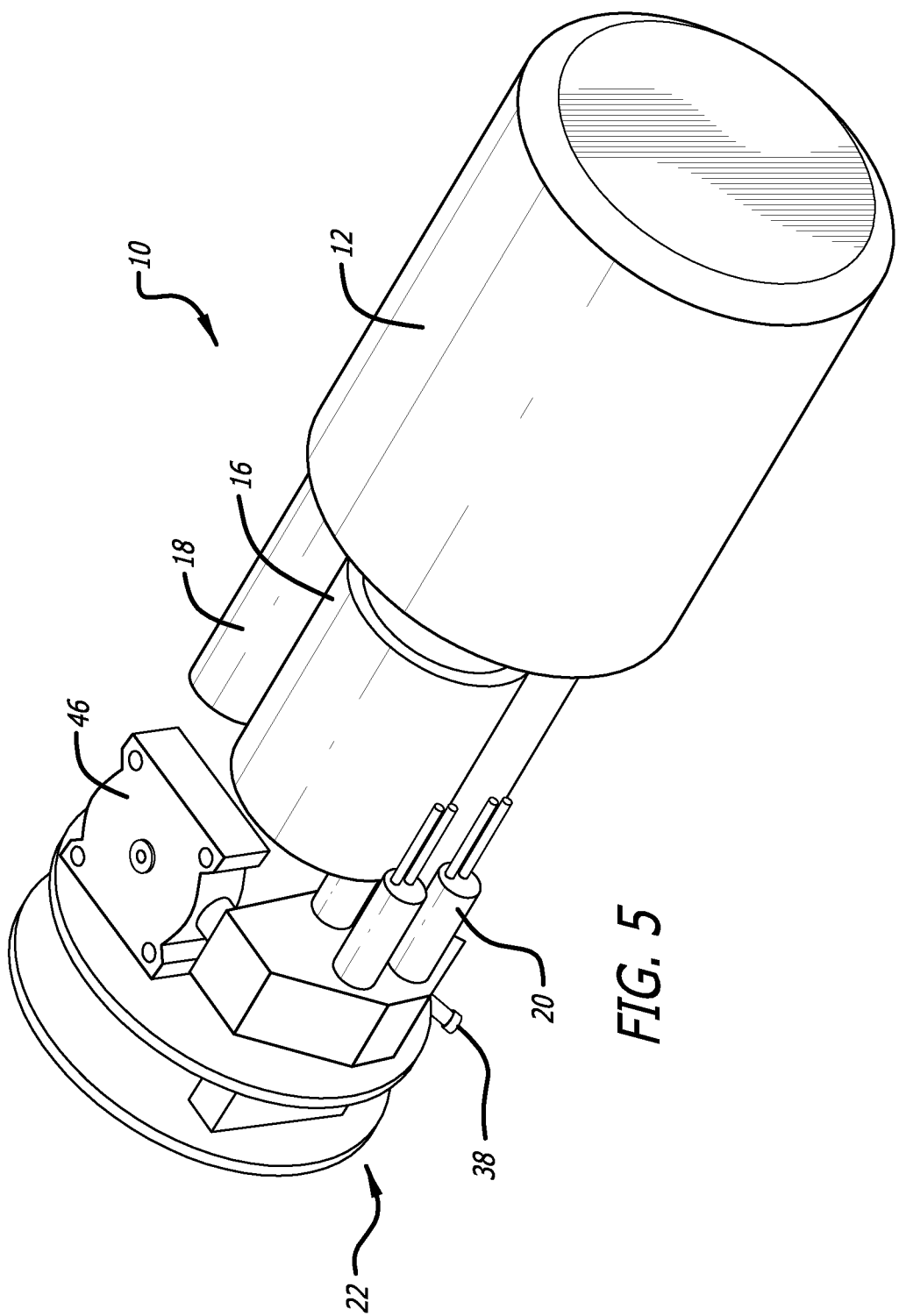
FIG. 5 is a second perspective view showing the internal components of the aircraft emergency oxygen dispensing device of FIG. 1.

Referring to the drawings, which are provided by way of example, and not by way of limitation, the present invention provides for an aircraft lavatory emergency oxygen device for use in civilian and military airplanes to provide supplemental oxygen suitable for breathing by a user in small quantities.

The aircraft lavatory emergency oxygen device of the invention preferably is a non-chemical, self-contained oxygen dispensing device that is configured and dimensioned to fit into an existing space allocated for a chemical oxygen generator, allowing the aircraft lavatory emergency oxygen device of the invention to be retrofit into existing chemical oxygen generator systems. The invention also incorporates electronic controls, a power supply and hardware to dispense the gaseous oxygen in small quantities. The storage vessel and controls are incorporated into a single container to replace traditional chemical oxygen generators or to provide supplemental oxygen in an aircraft lavatory or other airplane locations. Self-containment in a single package makes retrofitting the design possible.

It would be desirable to resolve the conflict between Airworthiness Directive 2011-04-09, requiring the removal or disabling of chemical oxygen generators from aircraft lavatories, and FAR 25.1447, requiring supplemental emergency oxygen to be available in aircraft lavatories, by providing oxygen to aircraft lavatories by without reliance upon chemical oxygen generators, and without significant modification to the existing installations.

Referring to FIGS. 1-6, in a first embodiment, the present invention accordingly provides for an aircraft lavatory emergency oxygen device 10 for use in civilian and military airplanes to provide supplemental oxygen suitable for breathing. The device includes a small, high pressure oxygen storage vessel 12 for storing high pressure gaseous oxygen that preferably is sealed by a pressure seal 14 to prevent flow from the oxygen storage vessel until the pressure seal is broken. The pressure seal also provides overpressure protection for the vessel. The pressure seal may, for example, be a rupture disc formed of frangible material capable of being fractured to open the oxygen storage vessel and initiate the flow of oxygen from the oxygen storage vessel. The pressure in the small, high pressure oxygen storage vessel is typically approximately 3000 psi, for example, although other similar storage pressures may also be suitable.

A manifold 16 is connected in fluid communication with the oxygen storage vessel and a pressure regulator 18 that is connected in fluid communication with the manifold to receive the flow of oxygen at the high, first oxygen pressure from the oxygen storage vessel through the manifold. The pressure regulator is configured to deliver the flow of oxygen at a second oxygen pressure lower than the first oxygen pressure. In a presently preferred aspect, the lower, second oxygen pressure is 16 psig, although similar lower oxygen pressures may also be suitable. In a presently preferred aspect, the pressure seal of the oxygen storage vessel is disposed in the manifold, as will be explained further hereinbelow.

One or more flow control valves 20 are connected in fluid communication with the pressure regulator, and a flow controller 22 is connected to the one or more flow control valves to control the operation of the one or more flow control valves. The flow controller typically is preferably electronic, and may be constructed of one or more printed circuit boards (PCB), for example. The flow controller preferably is configured to rapidly supply oxygen at an initial altitude, such as 30,000 ft. or greater, for example, and throughout at least a portion of subsequent descent of the aircraft, such as above 10,000 ft., for example, typically for periods of approximately 12-22 minutes, for one or more persons, for example.

As is illustrated in FIGS. 1-4, the aircraft lavatory emergency oxygen device preferably includes a power supply 24 disposed within the container housing that is configured to provide power to the flow controller and the one or more flow control valves. The power supply can be a small battery pack including a one or more batteries, although the device can alternatively use another type of power supply, such as an external battery, for example, or a connection to an aircraft power supply, to obtain the required power.

The manifold includes an initiator 26 is configured to break the pressure seal to initiate a flow of oxygen from the oxygen storage vessel, and receives a flow of oxygen from the oxygen storage vessel at a first oxygen pressure. The initiator preferably includes a lance 28 configured to mechanically break the rupture disc. In a presently preferred aspect, the initiator can be a sealed electro-pyrotechnic actuator 30 that can be electronically activated. Other devices for fracturing the rupture disc may alternatively be suitable, as long as an appropriate pressure seal can be maintained downstream of the oxygen storage vessel and opened as desired.

As is shown in FIGS. 1-5, the aircraft lavatory emergency oxygen device preferably includes an ambient cabin air pressure sensor 34 connected to the flow controller and disposed within the container housing. The ambient cabin air pressure sensor is typically a transducer connected to the PCB of the flow controller, and is configured to detect the ambient cabin air pressure in the aircraft and generate an ambient cabin air pressure signal 36 indicating the ambient cabin air pressure in the aircraft. The one or more flow control valves each have a flow control valve outlet 38, and receive and meter the flow of oxygen at the second oxygen pressure from the pressure regulator to one or more breathing masks 40, each of which is connected to a corresponding flow control valve outlet, by metering small quantities of oxygen to the one or more breathing masks by a pulse oxygen system, in which the flow controller is configured to receive the ambient cabin air pressure signal from the ambient cabin air pressure sensor in the aircraft, and determine what quantity of oxygen is to be provided to the one or more breathing masks, to control operation of the one or more flow control valves responsive to the ambient cabin air pressure signal. In a presently preferred aspect, the small quantities of oxygen that are metered to the one or more breathing masks that are less than that typically provided by a chemical oxygen generator, while an equivalent level of hypoxia protection is provided by the pulse oxygen system in aircraft decompression events. The pulse oxygen system typically adjusts an allotment of oxygen to each individual user as function of the user's actual demand for oxygen, such as according to a user's respiration rate, for example, wherein faster breathing results in a faster delivery rate of the user's oxygen allotments, such as is described in U.S. Pat. No. 7,588,032, which is incorporated by reference herein.

One or more breathing masks are typically connected to receive the flow of oxygen at the second oxygen pressure from the one or more flow control valves, and a breathing mask air pressure sensor 46, such as an electro-pneumatic sensor, typically connected to the breathing mask, or disposed in the breathing mask, for example, monitors the breathing of the user, and is connected to the flow controller, so that the one or more flow control valves can be controlled by the flow controller responsive to the breathing mask air pressure sensor. In the pulse oxygen system, the one or more flow control valves are configured to limit the flow of oxygen to the one or more breathing masks to a period of time during each respiratory cycle of the user that is sufficient to allow only a preselected volume of oxygen to flow to the one or more breathing masks during each respiratory cycle of the user. The one or more flow control valves may be a solenoid valve, for example, for switching the flow of oxygen to the one or more breathing masks for the period of time during each respiratory cycle of the user responsive to a breathing mask air pressure signal from a pressure sensor configured to detect a pressure within the one or more breathing masks. In a presently preferred aspect, the breathing mask air pressure sensor detects a differential vacuum pressure created by a user inhaling through the one or more breathing masks and generates a differential vacuum pressure signal 48 received by the flow controller, so that the one or more flow control valves can be controlled by the flow controller responsive to the differential vacuum pressure signal.

Figure 6:
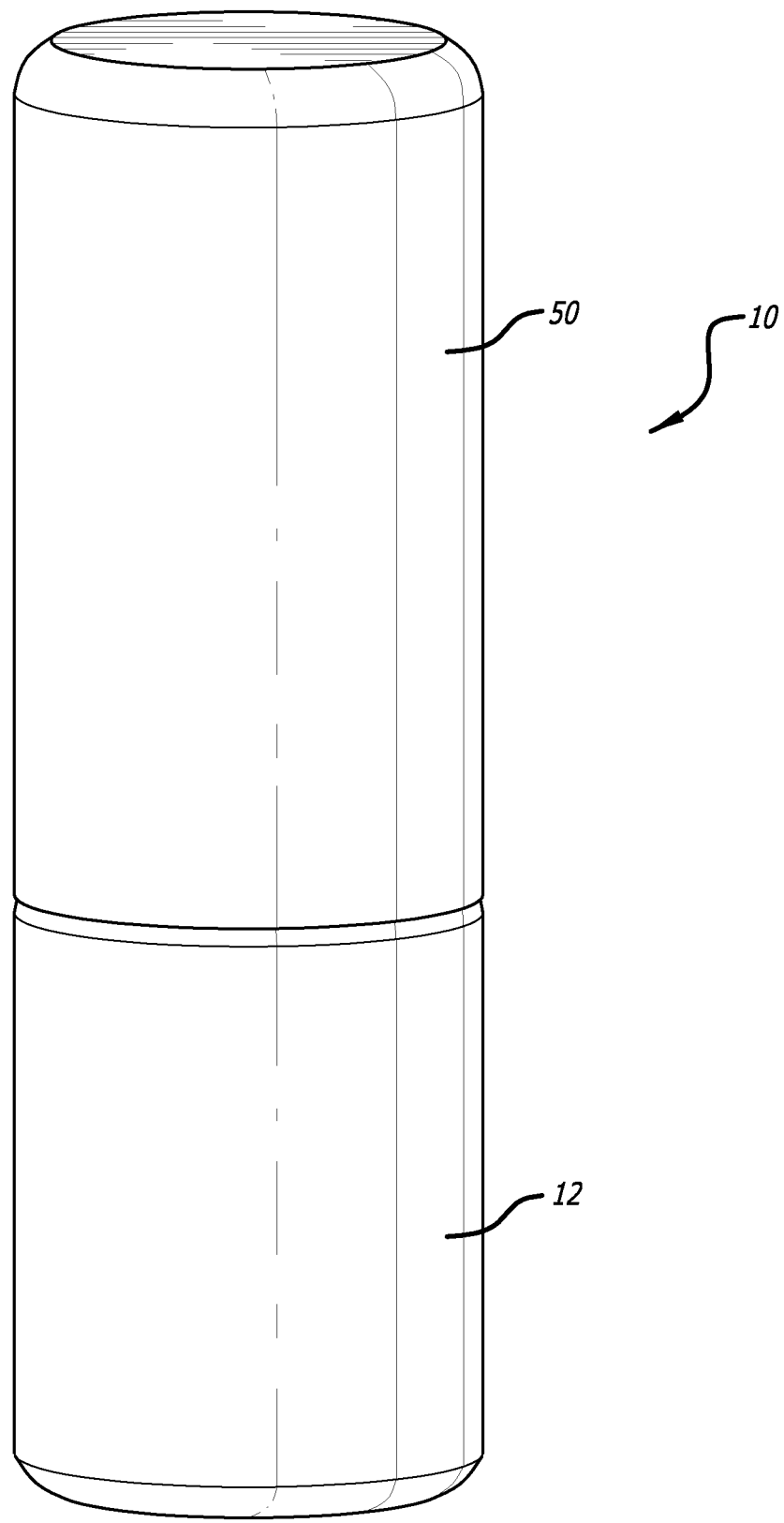
FIG. 6 is a side view of a fully assembled aircraft emergency oxygen dispensing device of FIG. 1, including a container housing protective cover portion or assembly cap.
Figure 7:
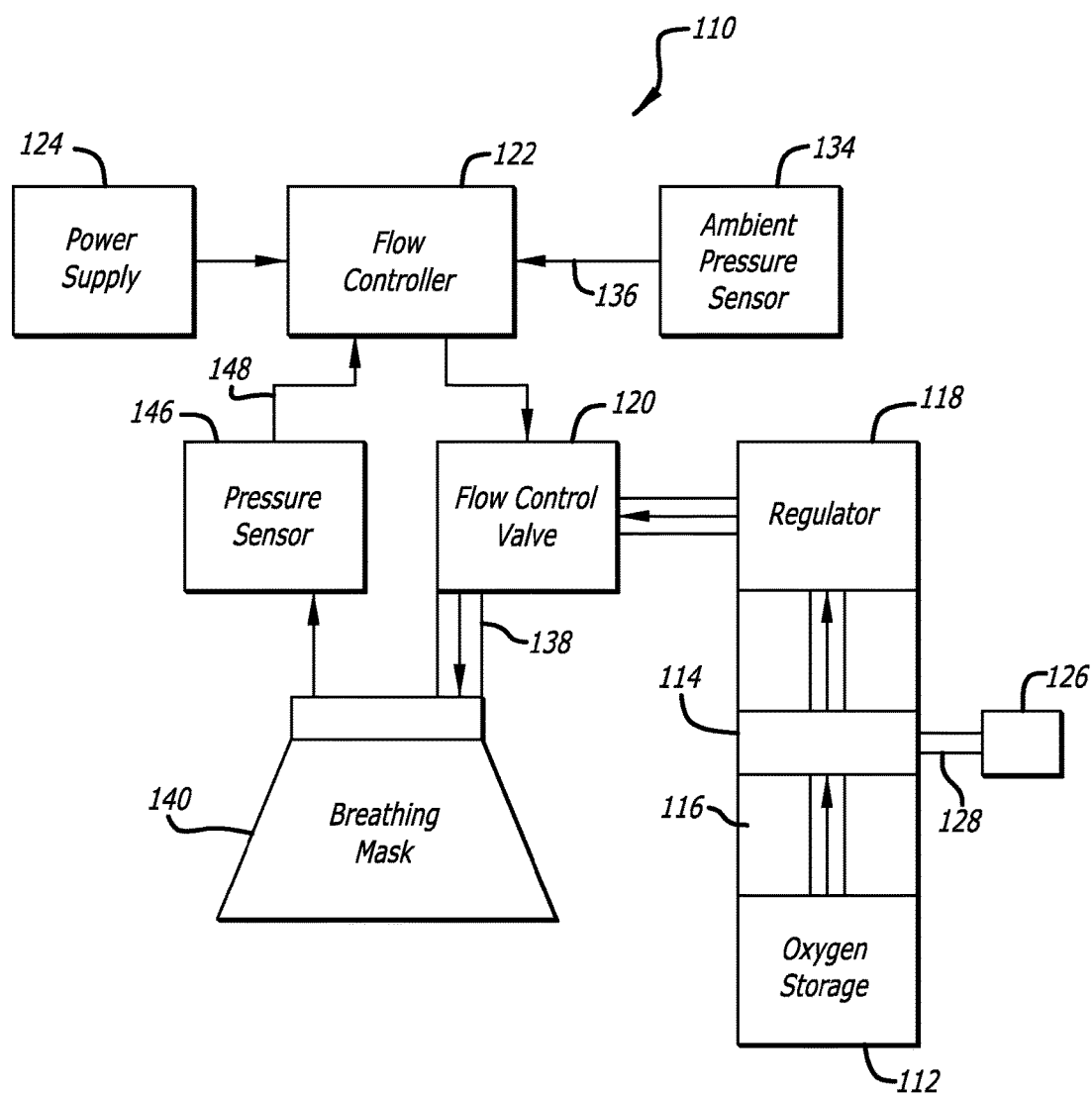
FIG. 7 is a schematic diagram of a second embodiment of an aircraft emergency oxygen dispensing device according to the present invention.
Figure 8:
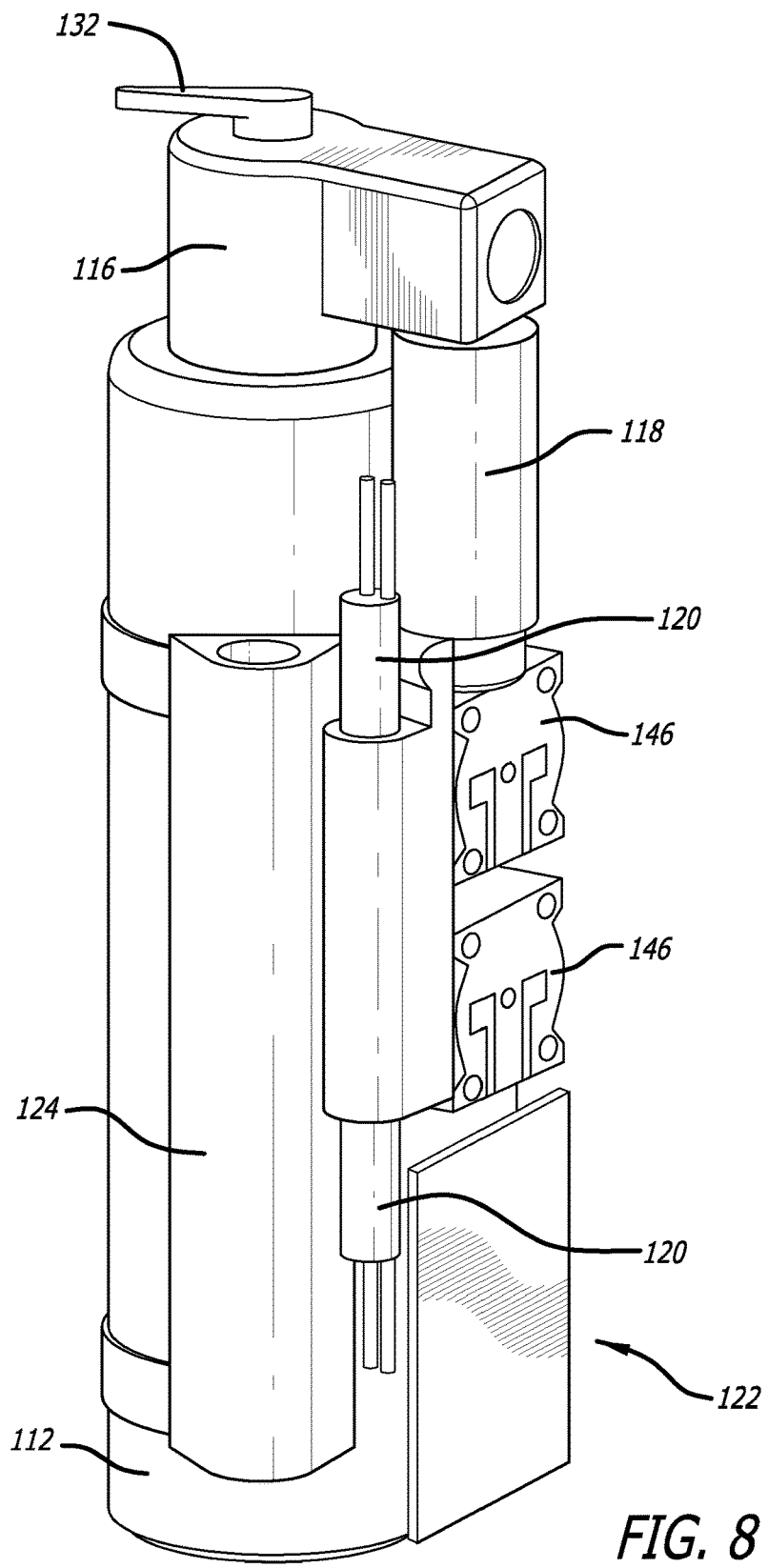
FIG. 8 is a first perspective view showing the internal components of the aircraft emergency oxygen dispensing device of FIG. 7.
Figure 9:
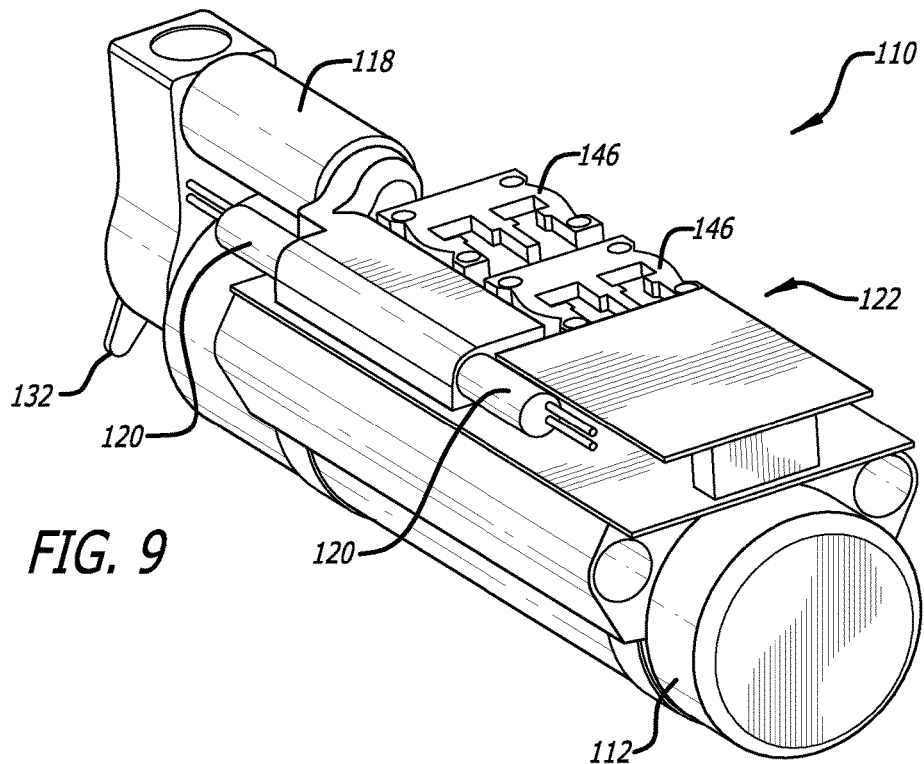
FIG. 9 is a second perspective view showing the internal components of the aircraft emergency oxygen dispensing device of FIG. 7.
Figure 10:
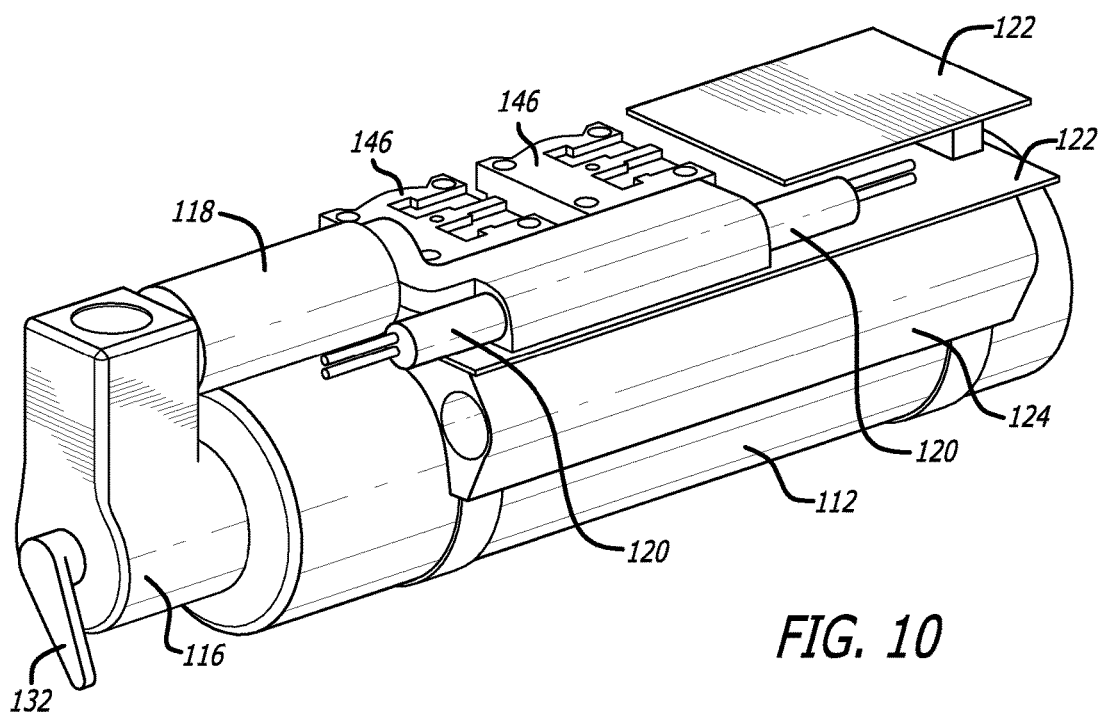
FIG. 10 is a third perspective view showing the internal components of the aircraft emergency oxygen dispensing device of FIG. 7.
Figure 11:
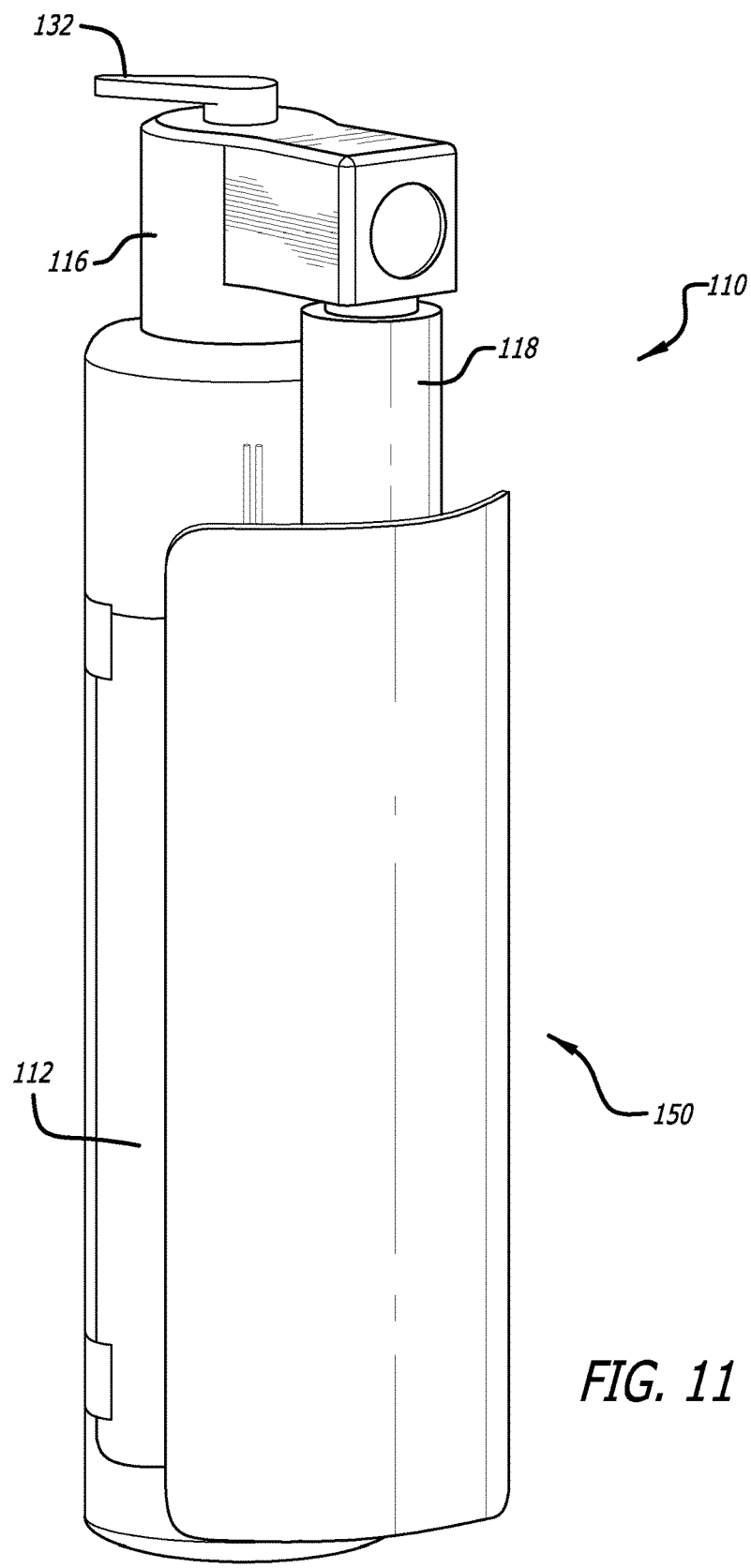
FIG. 11 is a side view of a fully assembled aircraft emergency oxygen dispensing device of FIG. 7, including a container housing protective cover portion or assembly cap.

As is illustrated in FIG. 6, the aircraft lavatory emergency oxygen device preferably includes a container housing, protective cover portion, shroud or assembly cap 50 that covers the assembly of the flow controller, flow and pressure control components, and power supply, to seal and protect the components. The container housing, protective cover portion, shroud or assembly cap is typically generally tubular, and typically can be approx. 2¾ inch diameter, approx. 8 inch length, for example. In a presently preferred aspect, the combined assembly of the container housing portion or assembly capsule and storage vessel is dimensioned to be retrofit in an existing space envelope allocated for a chemical oxygen generator in an aircraft. In another presently preferred aspect, the oxygen storage vessel is a single use oxygen storage vessel, although the oxygen storage vessel may alternatively be a rechargeable oxygen storage vessel.

Referring to FIGS. 7-11, in a second embodiment, the present invention provides for an aircraft lavatory emergency oxygen device 110 for use in civilian and military airplanes to provide supplemental oxygen suitable for breathing. The device includes a small oxygen storage vessel 112 for storing high pressure gaseous oxygen that preferably is sealed by a pressure seal 114 to prevent flow from the oxygen storage vessel until the pressure seal is broken. The pressure seal may, for example, be a rupture disc formed of frangible material capable of being fractured to open the oxygen storage vessel and initiate the flow of oxygen from the oxygen storage vessel.

A manifold 116 is connected in fluid communication with the oxygen storage vessel and a pressure regulator 118 that is connected in fluid communication with the manifold to receive the flow of oxygen at the high, first oxygen pressure from the oxygen storage vessel through the manifold. The pressure regulator is configured to deliver the flow of oxygen at a second oxygen pressure lower than the first oxygen pressure. In a presently preferred aspect, the second oxygen pressure is 16 psig. In a presently preferred aspect, the pressure seal is disposed in the manifold.

One or more flow control valves 120 are connected in fluid communication with the pressure regulator, and a flow controller 122 is connected to the one or more flow control valves to control the operation of the one or more flow control valves. The flow controller typically is configured to rapidly supply oxygen at an initial altitude, such as 30,000 ft. or greater, for example, and throughout at least a portion of subsequent descent of the aircraft, such as above 10,000 ft., for example, typically for periods of approximately 12-22 minutes, for one or more persons, for example.

In another presently preferred aspect, the aircraft lavatory emergency oxygen device includes a power supply 124 that is configured to provide power to the flow controller and the one or more flow control valves, and the power supply can be disposed in or protected by the container housing, for example, as will be explained further below. The power supply can be a small battery pack including a one or more batteries, although the device can alternatively use another type of power supply, such as an external battery, for example, or a connection to an aircraft power supply, to obtain the required power.

The manifold includes an initiator 126 configured to break the pressure seal to initiate a flow of oxygen from the oxygen storage vessel, and receives a flow of oxygen from the oxygen storage vessel at a first oxygen pressure. The initiator preferably includes a lance 128 configured to mechanically break the rupture disc. As is illustrated in FIGS. 8-11, the initiator can be configured to be manually activated, such as by turning a lever 132 to advance the lance to mechanically break the pressure seal, or by turning a wheel to advance the lance to mechanically break the pressure seal. Other devices for fracturing the rupture disc may alternatively be suitable, as long as an appropriate pressure seal can be maintained downstream of the oxygen storage vessel and opened as desired.

As is shown in FIGS. 7-10, the aircraft lavatory emergency oxygen device preferably includes an ambient cabin air pressure sensor 134 connected to the flow controller and disposed within the container housing. The ambient cabin air pressure sensor is typically a transducer connected to the PCB of the flow controller, and is configured to detect the ambient cabin air pressure in the aircraft and generate an ambient cabin air pressure signal 136 indicating the ambient cabin air pressure in the aircraft. The one or more flow control valves each have a flow control valve outlet 138, and receive and meter the flow of oxygen at the second oxygen pressure from the pressure regulator to one or more breathing masks 140, each of which is connected to a corresponding flow control valve outlet, by metering small quantities of oxygen to the one or more breathing masks by a pulse oxygen system, in which the flow controller receives the ambient cabin air pressure signal from the ambient cabin air pressure sensor in the aircraft, and determines what quantity of oxygen is to be provided to the one or more breathing masks to control operation of the one or more flow control valves responsive to the ambient cabin air pressure signal. In a presently preferred aspect, the small quantities of oxygen that are metered to the one or more breathing masks that are less than that typically provided by a chemical oxygen generator, while an equivalent level of hypoxia protection is provided by the pulse oxygen system in aircraft decompression events. The pulse oxygen system typically adjusts an allotment of oxygen to each individual user as function of the user's actual demand for oxygen, such as according to a user's respiration rate, for example, wherein faster breathing results in a faster delivery rate of the user's oxygen allotments, such as is described in U.S. Pat. No. 7,588,032, which is incorporated by reference herein.

In the pulse oxygen system, the one or more flow control valves are configured to limit the flow of oxygen to the one or more breathing masks to a period of time during each respiratory cycle of the user that is sufficient to allow only a preselected volume of oxygen to flow to the one or more breathing masks during each respiratory cycle of the user. The one or more flow control valves may be a solenoid valve, for example, for switching the flow of oxygen to the one or more breathing masks for the period of time during each respiratory cycle of the user responsive to a breathing mask air pressure signal from a pressure sensor configured to detect a pressure within the one or more breathing masks. One or more breathing masks are typically connected to receive the flow of oxygen at the second oxygen pressure from the one or more flow control valves, and a breathing mask air pressure sensor 146, such as an electro-pneumatic sensor typically connected to the breathing mask, or disposed in the breathing mask, for example, monitors the breathing of the user, and is connected to the flow controller, so that the one or more flow control valves can be controlled by the flow controller responsive to the breathing mask air pressure sensor. In a presently preferred aspect, the breathing mask air pressure sensor detects a differential vacuum pressure created by a user inhaling through the one or more breathing masks and generates a differential vacuum pressure signal 148 received by the flow controller, so that the one or more flow control valves can be controlled by the flow controller responsive to the differential vacuum pressure signal.

A container housing, protective cover portion, shroud or assembly cap 150 covers the oxygen storage vessel, flow controller, flow and pressure control components and power supply, to seal and protect the components, and typically can be approx. 2¾ inch diameter, approx. 8 inch length, for example. In a presently preferred aspect, the combined assembly of the container housing portion or assembly capsule and storage vessel is dimensioned to be retrofit in an existing space envelope allocated for a chemical oxygen generator in an aircraft. In another presently preferred aspect, the oxygen storage vessel is a single use oxygen storage vessel, although the oxygen storage vessel may alternatively be a rechargeable oxygen storage vessel.

Figure 12:
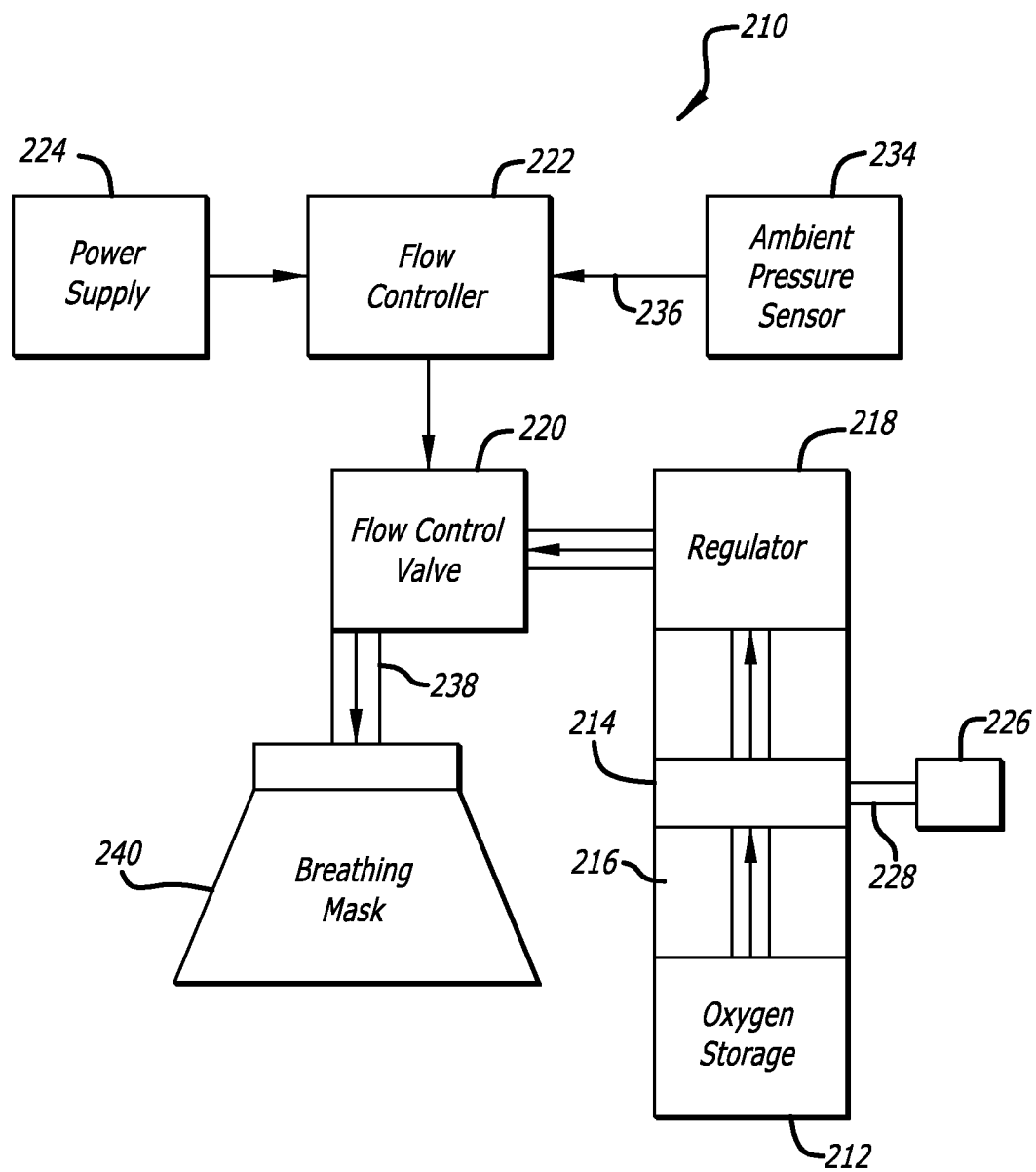
FIG. 12 is a schematic diagram of a third embodiment of an aircraft emergency oxygen dispensing device according to the present invention.
Figure 13:
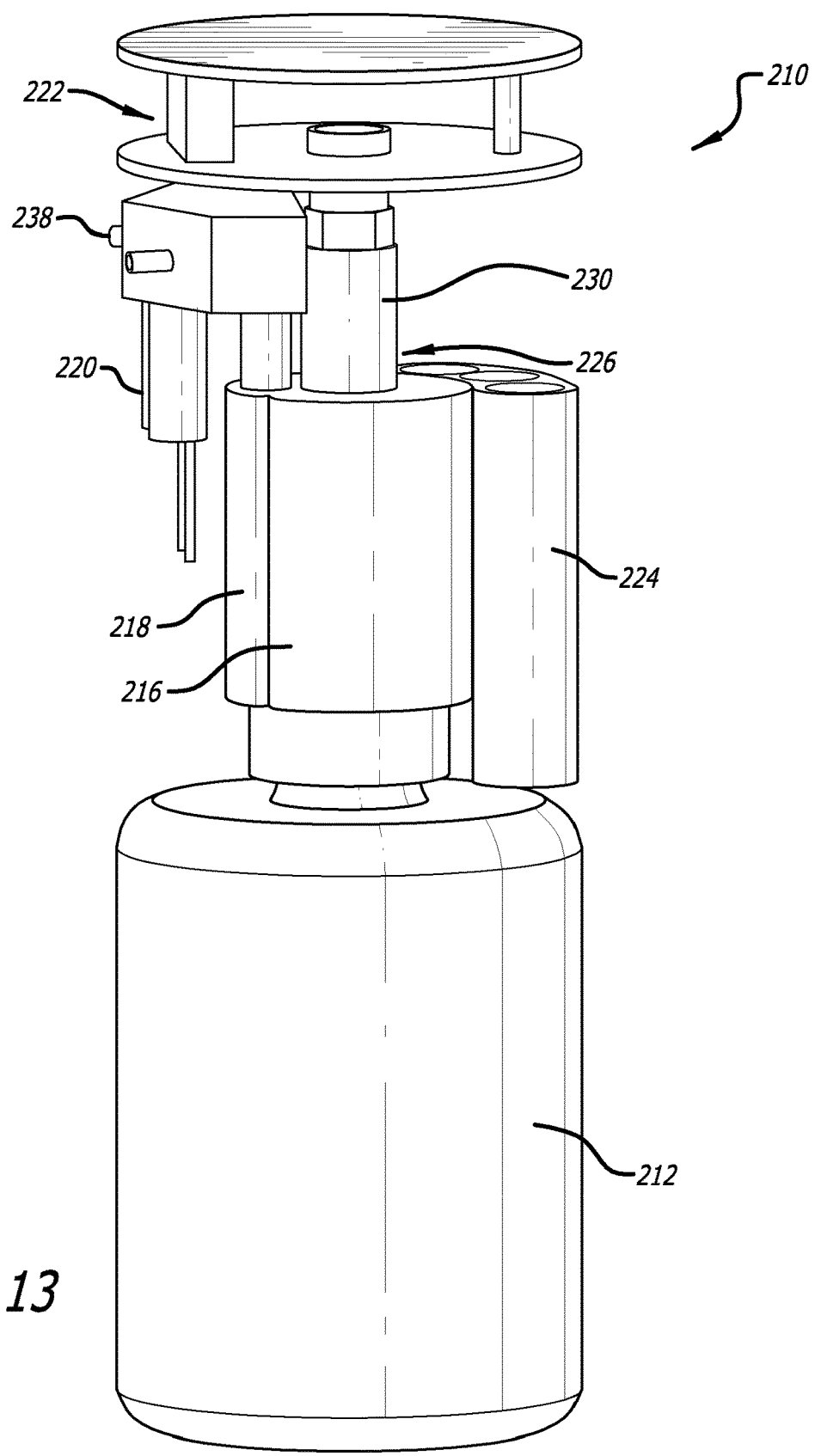
FIG. 13 is side view showing the internal components of the aircraft emergency oxygen dispensing device of FIG. 12.
Figure 14:
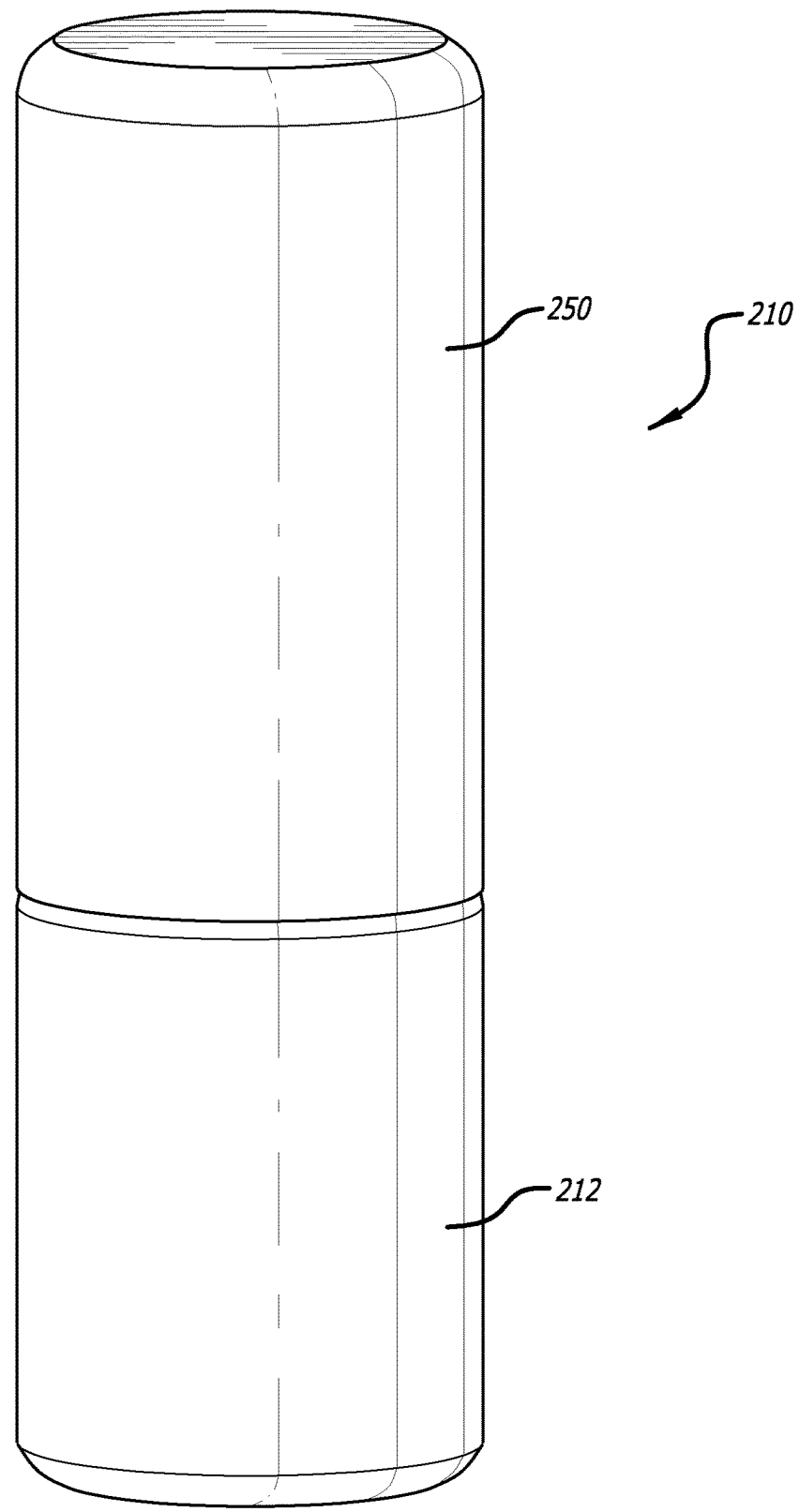
FIG. 14 is a side view of a fully assembled aircraft emergency oxygen dispensing device of FIG. 12, including a container housing protective cover portion or assembly cap.

In a third presently preferred embodiment illustrated in FIGS. 12-14, the one or more flow control valves are configured to modulate the flow of oxygen to flow continuously to one or more breathing masks, such as by a modulated oxygen system (MOS). The aircraft lavatory emergency oxygen device 210 includes a small oxygen storage vessel 212 for storing high pressure gaseous oxygen that preferably is sealed by a pressure seal 214 to prevent flow from the oxygen storage vessel until the pressure seal is broken. The pressure seal may, for example, be a rupture disc formed of frangible material capable of being fractured to open the oxygen storage vessel and initiate the flow of oxygen from the oxygen storage vessel.

A manifold 216 is connected in fluid communication with the oxygen storage vessel, and a pressure regulator 218 is connected in fluid communication with the manifold to receive the flow of oxygen at the first oxygen pressure through the manifold. The pressure regulator is configured to deliver the flow of oxygen at a second oxygen pressure lower than the first oxygen pressure. In a presently preferred aspect, the second oxygen pressure is 16 psig.

One or more flow control valves 220 are connected in fluid communication with the pressure regulator, and a flow controller 222 is connected to the one or more flow control valves for controlling the operation of the one or more flow control valves. The flow controller typically is configured to rapidly supply oxygen at an initial altitude, such as 30,000 ft. or greater, for example, and throughout at least a portion of subsequent descent of the aircraft, such as above 10,000 ft., for example, typically for periods of approximately 12-22 minutes, for one or more persons, for example.

As is shown in FIG. 12, the pressure seal is disposed in the manifold. In another presently preferred aspect, the aircraft lavatory emergency oxygen device includes a power supply 224 configured to provide power to the flow controller and the one or more flow control valves is provided, and the power supply can be disposed in or protected by the container housing, for example, as will be explained further below. The power supply can be a small battery pack including a one or more batteries, although the device can alternatively use another type of power supply, such as an external battery, for example, or a connection to an aircraft power supply, to obtain the required power.

The manifold includes an initiator 226 configured to break the pressure seal to initiate a flow of oxygen from the oxygen storage vessel, and receives a flow of oxygen from the oxygen storage vessel at a first oxygen pressure. The initiator preferably includes a lance 228 configured to mechanically break the rupture disc. In a presently preferred aspect, the initiator can be a sealed electro-pyrotechnic actuator 230 that can be electronically activated. Other devices for fracturing the rupture disc may alternatively be suitable, as long as an appropriate pressure seal can be maintained downstream of the oxygen storage vessel and opened as desired.

Referring to FIGS. 12-13, the aircraft lavatory emergency oxygen device preferably includes an ambient cabin air pressure sensor 234 connected to the flow controller and disposed within the container housing. The ambient cabin air pressure sensor is typically a transducer connected to the PCB of the flow controller, and is configured to detect the ambient cabin air pressure in the aircraft and generate an ambient cabin air pressure signal 236 indicating the ambient cabin air pressure in the aircraft. The one or more flow control valves each have a flow control valve outlet 238, and receive and meter the flow of oxygen at the second oxygen pressure from the pressure regulator to one or more breathing masks 240, each of which is connected to a corresponding flow control valve outlet, by metering small quantities of oxygen to the one or more breathing masks by a pulse oxygen system, in which the flow controller receives the ambient cabin air pressure signal from an ambient cabin air pressure sensor in the aircraft, and determines what quantity of oxygen is to be provided to the one or more breathing masks to control operation of the one or more flow control valves responsive to the ambient cabin air pressure signal.

In the modulated oxygen system, the one or more flow control valves are configured to modulate the flow of oxygen to flow continuously to the one or more breathing masks based upon an ambient cabin air pressure in the aircraft. In the modulated oxygen system, one or more inlet valves may by on-off inlet valves, such as two-position solenoid valves, or one or more electrically operated valves that are capable of assuming a multiplicity of states between fully open and fully closed, for example, which in combination with suitable sensors and suitable control logic, can operate efficiently at a range of altitudes. These technologies utilize less oxygen than a chemical oxygen generator to provide an equivalent level of hypoxia protection in aircraft decompression events.

As is shown in FIG. 14, a container housing, protective cover portion, shroud or assembly cap 250 covers the flow controller, flow and pressure control components and power supply, to seal and protect the components, and is typically generally tubular, and typically can be approx. 2¾ inch diameter, approx. 8 inch length, for example. In a presently preferred aspect, the combined assembly of the container housing portion or assembly capsule and storage vessel is dimensioned to be retrofit in an existing space envelope allocated for a chemical oxygen generator in an aircraft. In another presently preferred aspect, the oxygen storage vessel is a single use oxygen storage vessel, although the oxygen storage vessel may alternatively be a rechargeable oxygen storage vessel.

Figure 15:
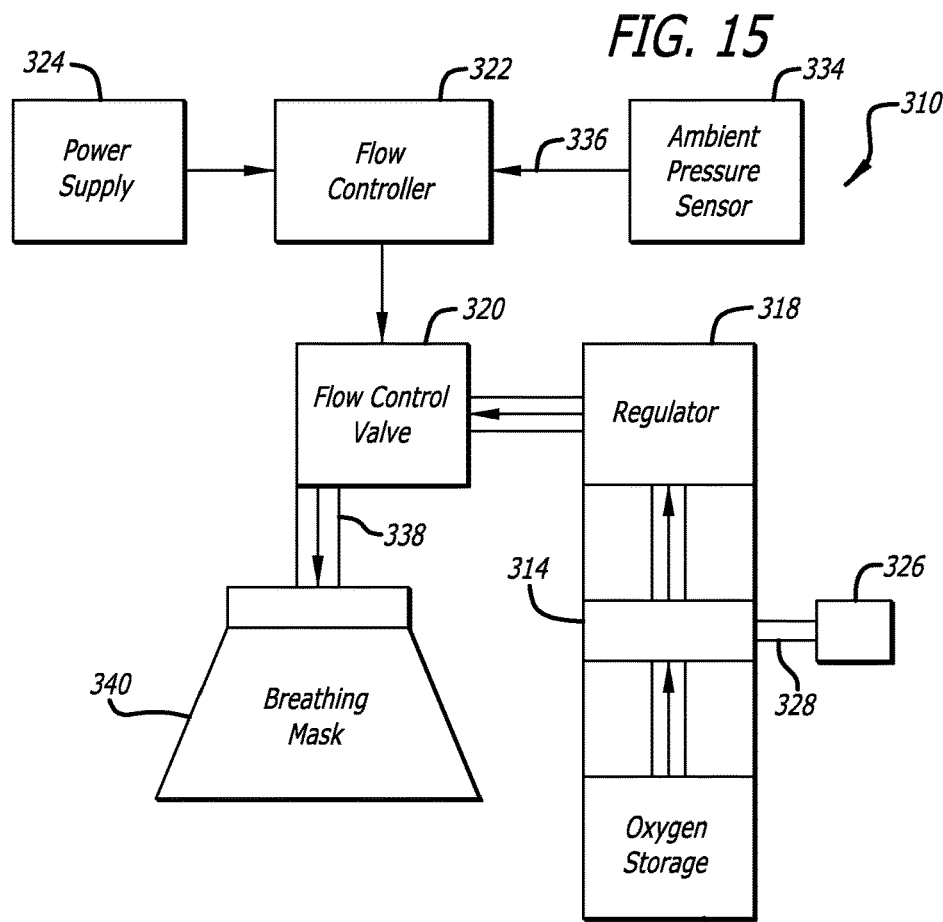
FIG. 15 is a schematic diagram of a fourth embodiment of an aircraft emergency oxygen dispensing device according to the present invention.
Figure 16:
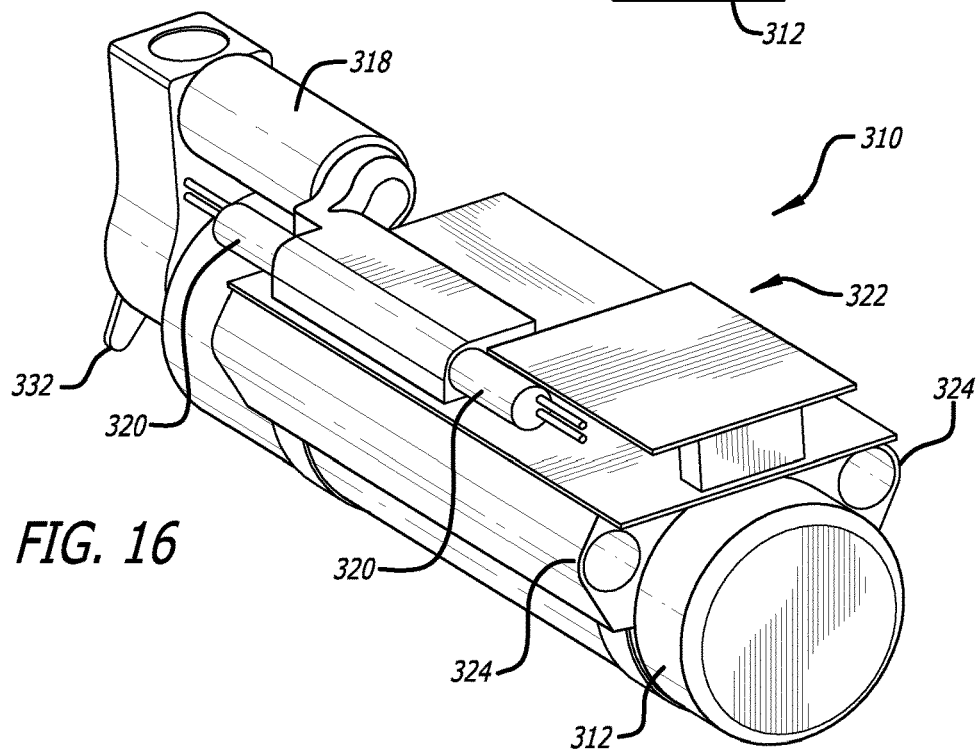
FIG. 16 is perspective view showing the internal components of the aircraft emergency oxygen dispensing device of FIG. 15.
Figure 17:
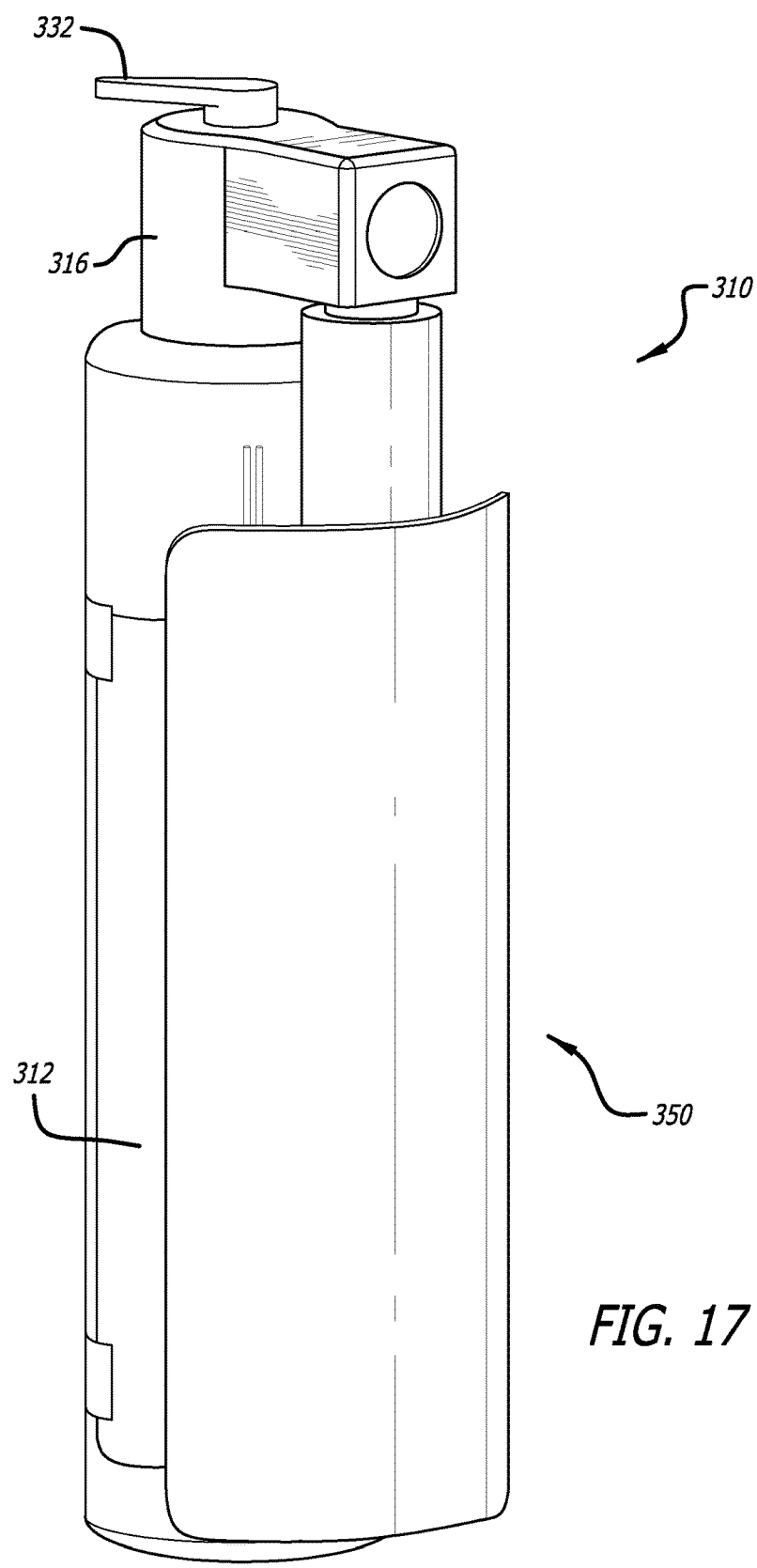
FIG. 17 is a side view of a fully assembled aircraft emergency oxygen dispensing device of FIG. 15, including a container housing protective cover portion or assembly cap.

In a fourth presently preferred embodiment illustrated in FIGS. 15-17, the present invention provides for an aircraft lavatory emergency oxygen device 310 that includes a small oxygen storage vessel 312 for storing high pressure gaseous oxygen that preferably is sealed by a pressure seal 314 to prevent flow from the oxygen storage vessel until the pressure seal is broken. The pressure seal may, for example, be a rupture disc formed of frangible material capable of being fractured to open the oxygen storage vessel and initiate the flow of oxygen from the oxygen storage vessel.

As is illustrated in FIGS. 15-16, the aircraft lavatory emergency oxygen device includes a manifold 316 connected in fluid communication with the oxygen storage vessel, and a pressure regulator 318 is connected in fluid communication with the manifold to receive the flow of oxygen at the first oxygen pressure through the manifold. The pressure regulator is configured to deliver the flow of oxygen at a second oxygen pressure lower than the first oxygen pressure. In a presently preferred aspect, the second oxygen pressure is 16 psig. In a presently preferred aspect, the pressure seal is disposed in the manifold.

The aircraft lavatory emergency oxygen device includes one or more flow control valves 320 connected in fluid communication with the pressure regulator, and a flow controller 322 is connected to the one or more flow control valves. The flow controller typically is configured to rapidly supply oxygen at an initial altitude, such as 30,000 ft. or greater, for example, and throughout at least a portion of subsequent descent of the aircraft, such as above 10,000 ft., for example, typically for periods of approximately 12-22 minutes, for one or more persons, for example.

Referring to FIGS. 15-16, the aircraft lavatory emergency oxygen device includes a power supply 324 configured to provide power to the flow controller and the one or more flow control valves, and the power supply can be disposed in or protected by the container housing, for example, as will be explained further below. The power supply can be a small battery pack including a one or more batteries, although the device can alternatively use another type of power supply, such as an external battery, for example, or a connection to an aircraft power supply, to obtain the required power.

As is shown in FIG. 15, the manifold includes an initiator 326 configured to break the pressure seal to initiate a flow of oxygen from the oxygen storage vessel, and receives a flow of oxygen from the oxygen storage vessel at a first oxygen pressure. The initiator preferably includes a lance 328 configured to mechanically break the rupture disc. In a presently preferred aspect, the initiator can be configured to be manually activated, such as by turning a lever 332 to advance the lance to mechanically break the pressure seal, or by turning a wheel to advance the lance to mechanically break the pressure seal. Other devices for fracturing the rupture disc may alternatively be suitable, as long as an appropriate pressure seal can be maintained downstream of the oxygen storage vessel and opened as desired.

Referring to FIGS. 15-16, the aircraft lavatory emergency oxygen device preferably includes an ambient cabin air pressure sensor 334 connected to the flow controller and disposed within the container housing. The ambient cabin air pressure sensor is typically a transducer connected to the PCB of the flow controller, and is configured to detect the ambient cabin air pressure in the aircraft and generate an ambient cabin air pressure signal 336 indicating the ambient cabin air pressure in the aircraft. The one or more flow control valves each have a flow control valve outlet 338, and receive and meter the flow of oxygen at the second oxygen pressure from the pressure regulator to one or more breathing masks 340.

The one or more flow control valves are configured to modulate the flow of oxygen to flow continuously to the one or more breathing masks, such as by a modulated oxygen system (MOS). In the modulated oxygen system, the one or more flow control valves are configured to modulate the flow of oxygen to flow continuously to the one or more breathing masks based upon an ambient cabin air pressure in the aircraft. The one or more inlet valves may by on-off inlet valves, such as two-position solenoid valves, or one or more electrically operated valves that are capable of assuming a multiplicity of states between fully open and fully closed, for example, which in combination with suitable sensors and suitable control logic, can operate efficiently at a range of altitudes. These technologies utilize less oxygen than a chemical oxygen generator to provide an equivalent level of hypoxia protection in aircraft decompression events.

As is shown in FIG. 17, the aircraft lavatory emergency oxygen device preferably includes a container housing, protective cover portion, shroud or assembly cap 350 that covers the oxygen storage vessel, flow controller, flow and pressure control components and power supply, to seal and protect the components, and typically can be approx. 2¾ inch diameter, approx. 8 inch length, for example. In a presently preferred aspect, the combined assembly of the container housing portion or assembly capsule and storage vessel is dimensioned to be retrofit in an existing space envelope allocated for a chemical oxygen generator in an aircraft. In another presently preferred aspect, the oxygen storage vessel is a single use oxygen storage vessel, although the oxygen storage vessel may alternatively be a rechargeable oxygen storage vessel.

The aircraft lavatory emergency oxygen device of the invention operates in the same manner as a chemical oxygen generator, in the sense that a breathing mask attached to the aircraft lavatory emergency oxygen device is drawn to a passenger's face and donned the same as a breathing mask attached to a chemical oxygen generator, so that to a user, the oxygen masks look and operate the same as in existing oxygen equipment. The immediate application of the invention is to replace chemical oxygen generators installed in aircraft lavatories. However, the aircraft lavatory emergency oxygen device of the invention can also be used to replace chemical oxygen generators in passenger service unit (PSU) panels over cabin seats, and in other aircraft locations, such as over flight attendant seats, and in crew rest areas, for example.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An aircraft emergency oxygen dispensing device configured to be retrofit in an existing chemical oxygen generator space envelope allocated for a chemical oxygen generator in an aircraft for use in an aircraft cabin to dispense supplemental oxygen suitable for breathing by a user in small quantities, comprising:
   an oxygen storage vessel configured to store gaseous oxygen having suitable purity for breathing, said oxygen storage vessel being sealed by a pressure seal capable of being broken, said pressure seal being configured to seal against flow from said oxygen storage vessel until said pressure seal is broken;
   a manifold in fluid communication with said oxygen storage vessel and configured to receive a flow of oxygen from said oxygen storage vessel having a first oxygen pressure, and said manifold including an initiator configured to break said pressure seal to initiate a flow of oxygen from said oxygen storage vessel the pressure seal disposed in the manifold:
   a pressure regulator connected in fluid communication with said manifold to receive the flow of oxygen from said oxygen storage vessel through said manifold having the first oxygen pressure, said pressure regulator being configured to deliver the flow of oxygen at a second oxygen pressure lower than said first oxygen pressure, the pressure regulator downstream of the pressure seal;
   at least one flow control valve connected in fluid communication with said pressure regulator to receive and meter the flow of oxygen at the second oxygen pressure from the pressure regulator to at least one breathing mask;
   an ambient cabin pressure sensor connected to said flow controller and configured to detect the ambient cabin pressure in the aircraft and generate an ambient cabin air pressure signal indicating the ambient cabin air pressure in the aircraft;
   a flow controller connected to said at least one flow control valve, said flow controller being configured to be connected to receive the ambient cabin air pressure signal from said ambient cabin air pressure sensor indicating ambient cabin air pressure in the aircraft, said controller being configured to determine a quantity of oxygen to be provided to the at least one breathing mask to control operation of said at least one flow control valve responsive to the ambient cabin air pressure signal, and wherein said at least one flow control valve is configured to limit the flow of oxygen to the at least one breathing mask to a period of time during a respiratory cycle of the user that is sufficient to allow only a preselected volume of oxygen to flow to the at least one breathing mask during the respiratory cycle of the user;
   a power supply configured to provide power to said flow controller and said at least one flow control valve; and
   a cylindrical container housing arranged above said oxygen storage vessel and covering said manifold, said pressure regulator, said at least one flow control valve, said power supply, said flow controller, and at least a portion of said ambient cabin pressure sensor each of which are disposed above said oxygen storage vessel and within lateral bounds of said oxygen storage vessel, said cylindrical container housing not covering said oxygen storage vessel, wherein a combined assembly of the container housing, said manifold, said pressure regulator, said at least one flow control valve, said power supply, said flow controller and oxygen storage vessel is an elongate cylindrical assembly configured to be retrofit in the existing chemical oxygen generator space envelope in the aircraft; the elongate cylindrical assembly having a substantially constant exterior diameter.

2. The aircraft emergency oxygen dispensing device of claim 1, wherein said pressure seal comprises a rupture disc formed of frangible material capable of being fractured to open the oxygen storage vessel and initiate the flow of oxygen from said oxygen storage vessel.

3. The aircraft emergency oxygen dispensing device of claim 1, wherein said initiator comprises a lance configured to mechanically break the rupture disc.

4. The aircraft emergency oxygen dispensing device of claim 1, wherein said initiator is configured to be manually activated.

5. The aircraft emergency oxygen dispensing device of claim 1, wherein said initiator further comprises a lever configured to be manually turned to advance said lance to mechanically break said pressure seal.

6. The aircraft emergency oxygen dispensing device of claim 1, wherein said initiator is configured to be electronically activated.

7. The aircraft emergency oxygen dispensing device of claim 1, wherein said flow controller and said at least one flow control valve are configured to meter a small quantity of oxygen to the at least one breathing mask as a function of the user's demand for oxygen.

8. The aircraft emergency oxygen dispensing device of claim 1, further comprising at least one breathing mask air pressure sensor configured to generate a breathing mask air pressure signal indicating a pressure within the at least one breathing mask, and said flow controller being connected to receive said breathing mask air pressure signal, and wherein said flow controller is configured to control said at least one flow control valve to switch the flow of oxygen to the at least one breathing mask for a period of time during a respiratory cycle of the user that is sufficient to allow only a preselected volume of oxygen to flow to the at least one breathing mask during the respiratory cycle of the user responsive to said breathing mask air pressure signal.

9. The aircraft emergency oxygen dispensing device of claim 1, wherein said flow controller is configured to rapidly supply oxygen at an initial altitude and throughout at least a portion of a subsequent descent of the aircraft.

10. The aircraft emergency oxygen dispensing device of claim 1, further comprising said at least one breathing mask connected to receive the flow of oxygen at a second oxygen pressure from said at least one flow control valve, said at least one breathing mask connected to the at least one breathing mask air pressure sensor that monitors the breathing of the user, said at least one breathing mask air pressure sensor being connected to said flow controller, and said at least one flow control valve being controlled by said flow controller responsive to said at least one breathing mask air pressure sensor.

11. The aircraft emergency oxygen dispensing device of claim 10, wherein said at least one breathing mask air pressure sensor detects a differential vacuum pressure created by a user inhaling through said at least one breathing mask, said at least one breathing mask air pressure sensor being configured to generate a differential vacuum pressure signal, and said at least one flow control valve being controlled by said flow controller responsive to said differential vacuum pressure signal.

12. The aircraft emergency oxygen dispensing device of claim 10, wherein said at least one breathing mask air pressure sensor is disposed in said at least one breathing mask.

13. The aircraft emergency oxygen dispensing device of claim 10, wherein said at least one breathing mask air pressure sensor comprises an electro-pneumatic sensor.

14. An aircraft emergency oxygen dispensing device, comprising:
an oxygen storage vessel configured to store gaseous oxygen having suitable purity for breathing, the oxygen storage vessel being sealed by a pressure seal capable of being broken, the pressure seal being configured to seal against flow from the oxygen storage vessel until the pressure seal is broken;
a manifold in fluid communication with the oxygen storage vessel and configured to receive a flow of oxygen from the oxygen storage vessel having a first oxygen pressure, and the manifold including an initiator configured to break the pressure seal to initiate a flow of oxygen from the oxygen storage vessel, the pressure seal disposed in the manifold;
a pressure regulator connected in fluid communication with the manifold, the pressure regulator configured to deliver the flow of oxygen at a second oxygen pressure lower than the first oxygen pressure, the pressure regulator downstream of the pressure seal;
at least one flow control valve connected in fluid communication with the pressure regulator to receive and meter the flow of oxygen at the second oxygen pressure from the pressure regulator to at least one breathing mask;
an ambient cabin pressure sensor connected to the flow controller and configured to detect the ambient cabin pressure in the aircraft and generate an ambient cabin air pressure signal indicating the ambient cabin air pressure in the aircraft;
a flow controller connected to the at least one flow control valve, the flow controller configured to be connected to receive the ambient cabin air pressure signal from the ambient cabin air pressure sensor indicating ambient cabin air pressure in the aircraft, the controller configured to determine a quantity of oxygen to be provided to the at least one breathing mask to control operation of the at least one flow control valve responsive to the ambient cabin air pressure signal, wherein the at least one flow control valve is configured to limit the flow of oxygen to the at least one breathing mask to a period of time during a respiratory cycle of the user that is sufficient to allow only a preselected volume of oxygen to flow to the at least one breathing mask during the respiratory cycle of the user; and
a cylindrical container housing arranged above the oxygen storage vessel and covering the manifold, the pressure regulator, the at least one flow control valve, the flow controller, and at least a portion of the ambient cabin pressure sensor each of which are disposed above the oxygen storage vessel and within lateral bounds of the oxygen storage vessel, the cylindrical container housing not covering the oxygen storage vessel, wherein a combined assembly of the container housing, said manifold, said pressure regulator, said at least one flow control valve, said power supply, said flow controller and oxygen storage vessel is an elongate cylindrical assembly configured to be retrofit in the existing chemical oxygen generator space envelope in the aircraft; the elongate cylindrical assembly having a substantially constant exterior diameter.

* * * * *